Dec. 16, 1958   R. BUCK   2,864,172
DIVIDER
Filed Nov. 14, 1956
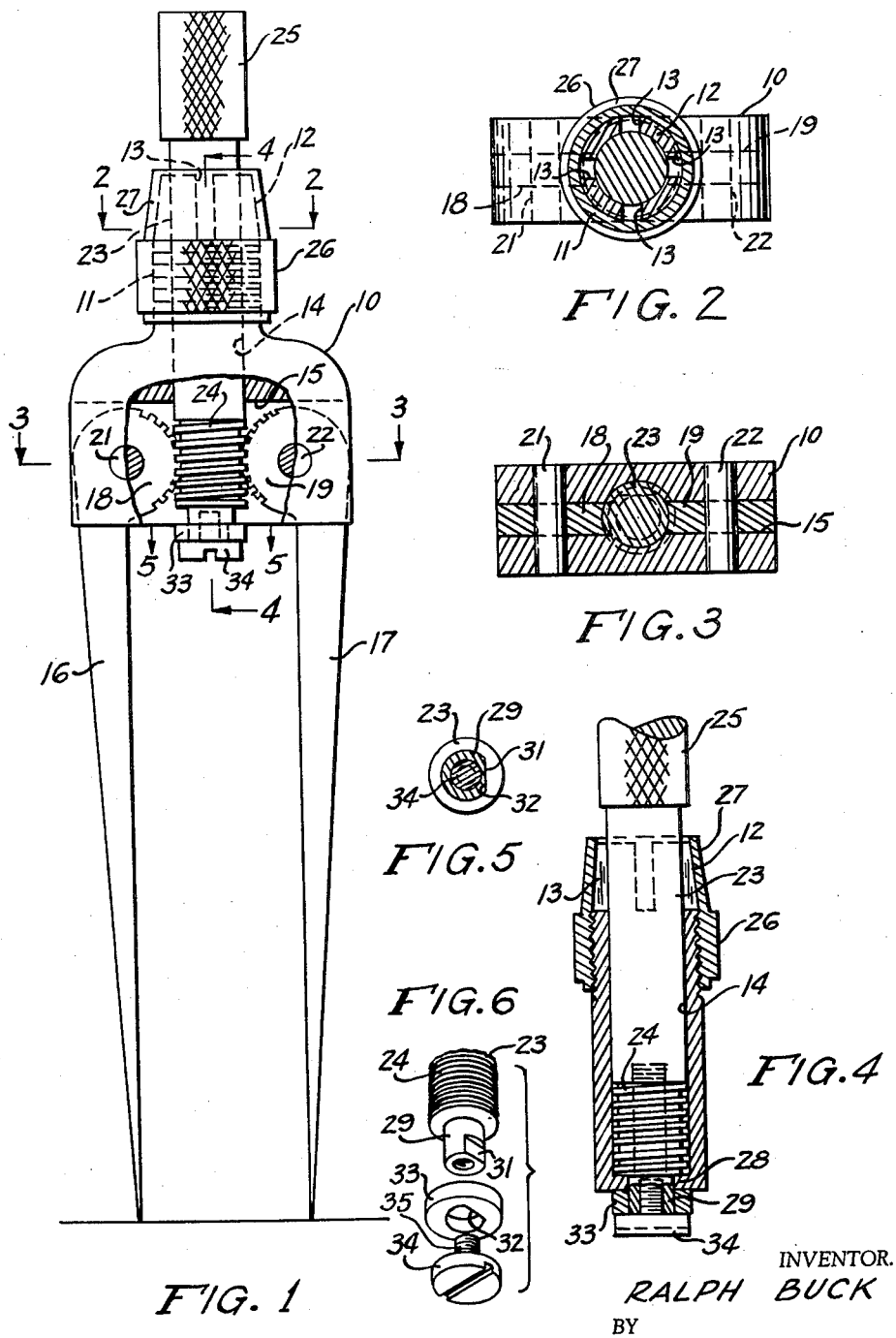
INVENTOR.
RALPH BUCK
BY
McMorrow, Berman + Davidson
ATTORNEYS { # United States Patent Office

2,864,172
Patented Dec. 16, 1958

2,864,172

DIVIDER

Ralph Buck, Degraff, Ohio

Application November 14, 1956, Serial No. 622,210

2 Claims. (Cl. 33—153)

The present invention relates to a divider.

An object of the present invention is to provide a divider in which the legs may be adjusted to the desired position and positively locked in such adjusted position.

Another object of the present invention is to provide a divider in which the means for adjusting the legs and the means for locking the legs in the adjusted position are adjacent each other and are readily accessible to the user.

A further object of the present invention is to provide a divider which is sturdy in construction, simple in structure, economical to manufacture and assemble, and one which is highly effective in action.

These and other objects and advantages of the present invention will be fully apparent from the following description when taken in connection with the annexed drawing, in which:

Figure 1 is a plan view of the divider of the present invention with a portion broken away and in section;

Figure 2 is a sectional view taken on line 2—2 of Figure 1;

Figure 3 is a sectional view taken on line 3—3 of Figure 1;

Figure 4 is a fragmentary sectional view taken on line 4—4 of Figure 1;

Figure 5 is a sectional view taken on line 5—5 of Figure 1; and

Figure 6 is an exploded view of the lower end portion of the actuating shaft, showing the locking means thereon.

Referring in greater detail to the drawing in which like numerals indicate like parts throughout the several views, the divider according to the present invention comprises a housing 10 and a sleeve 11 having a tapered portion 12 and provided in the tapered portion 12 with slots 13 here shown as four in number. A bore 14 extends through the sleeve 11 and through the housing 10 to the lower open end of the housing 10. A transversely arranged slot 15 extends from one side to the other of the housing 10 and is connected in communication with the bore 14.

A pair of legs 16 and 17 are arranged so that a portion of each of the legs adjacent one end thereof is enclosed within the slot 15 with the remaining portion of each of the legs 16 and 17 projecting out of the open end of the housing 10. A gear segment 18 is carried on the enclosed end portion of the legs 16 and a similar gear segment 19 is carried upon the enclosed end portion of the legs 17. Pins 21 and 22 connect the legs 16 and 17 to the housing 10 for pivotal movement relative to the housing 10.

A rotatable shaft 23 extends through the housing 10 and through the sleeve 11 and has a portion adjacent one end positioned within the slot 15 and has a portion adjacent the other end exteriorly of the sleeve 11 and provided with a knurled portion 25 embodying a hand grip means.

A worm 24 is carried on the one end portion of the shaft 23 within the open end of the housing 10 and is in meshing engagement with the gear segments 18 and 19.

A nut 26 is threadedly engaged upon the sleeve 11 which has threads on the portion adjacent the tapered portion 12 and is manually operable to tighten the sleeve 11 about the adjacent part of the shaft 23.

Means is provided for restraining the shaft 23 against longitudinal movement relative to the housing 10 and embodies a shoulder 28 on the housing 10 receiving the portion of the shaft 23 adjacent the reduced portion 29 which projects outwardly of the housing 10 and has a flat 31 against which bears the flat surface 32 of a washer 33. A cap screw 34 has a threaded shank 35 which extends through the washer 33 and is threadedly engaged in the threaded bore provided in the reduced portion 29 of the shaft 23 and, with the washer 33, restrains movement of the shaft 23 longitudinally within the bore 14.

In use, the divider according to the present invention is useful to machinists or mechanics, and the like, and the legs 16 and 17 may be rapidly set to any adjusted position by turning a knurled portion 25 of the shaft 23. The legs 16 and 17 may be locked in their adjusted position by turning of the nut 26 upon the threaded portion of the sleeve 11, the inner wall of the nut 26 being tapered as at 27 and conformably shaped to fit the tapered portion 12 of the sleeve 11. The knurled portion 25 of the shaft 23 is adjacent to the nut 26 so that the fingers of the hand that turn the knurled portion 25 may immediately reach and embrace the nut 26 for tightening the nut 26 about the sleeve 11 to lock the adjacent part of the shaft 23. The divider of the present invention permits the transferring of dimensions from a working drawing to a workpiece accurately and efficiently and without loss of time normally consumed by a user to reach the position of the divider legs relative to the dimensions of a working drawing.

What is claimed is:

1. A divider comprising a housing open at one end, a pair of legs arranged so that a portion of each of said legs adjacent one end thereof is enclosed within said open end of said housing with the remaining portion of each of said legs projecting out of the open end of said housing, a gear segment on the enclosed portion of each of said legs, a slotted threaded sleeve projecting longitudinally from the other end of said housing, a rotatable shaft extending through said housing and sleeve and having a portion adjacent one end positioned within said housing open end and having a portion adjacent the other end exteriorly of said sleeve, a worm on said one end portion of said shaft and in meshing engagement with said gear segments, said shaft one end portion being reduced and having a flat thereon, a washer provided with a flat surface circumposed upon said shaft reduced one end portion and having the flat surface bearing against the flat on said shaft reduced end portion, means embodying a cap screw threadedly carried by said shaft reduced one end portion abuttingly engaging said washer and a part of said housing adjacent the open end thereof and having a threaded shank extending through said washer and in threaded engagement with a threaded bore provided in said shaft reduced one end portion to restrain the shaft against rotational movement relative to said housing.

2. A divider comprising a housing open at one end, a pair of legs arranged so that a portion of each of said legs adjacent one end thereof is enclosed within said open end of said housing with the remaining portion of each of said legs projecting out of the open end of said housing, a gear segment on the enclosed portion of each of said legs, a slotted threaded sleeve projecting longitudinally from the other end of said housing, a rotatable shaft extending through said housing and sleeve and having a portion adjacent one end positioned within said housing open end and having a portion adjacent the other end exteriorly of said sleeve, a worm on said one end portion of said shaft and in meshing engagement with said gear segments, said shaft one end portion being reduced and having a flat thereon, a washer provided with a flat surface circumposed upon said shaft reduced one end portion and having the flat surface bearing against the flat on said shaft reduced end portion, means embodying a cap screw threadedly carried by said shaft reduced one end portion abuttingly engaging said washer and a part of said housing adjacent the open end thereof and having a threaded shank extending through said washer and in threaded engagement with a threaded bore provided in said shaft reduced one end portion to restrain said shaft against longitudinal movement relative to said housing, a nut threadably engaging said sleeve and manually operable to tighten said sleeve on the adjacent part of said shaft, and finger grip means on the other end portion of said shaft.

References Cited in the file of this patent

UNITED STATES PATENTS

| | | |
|---|---|---|
| 175,797 | Way | Apr. 4, 1876 |
| 760,956 | Cawley | May 24, 1904 |
| 1,707,931 | Gibbons | Apr. 2, 1929 |
| 2,040,517 | Kopsch | May 12, 1936 |
| 2,593,332 | Mucher | Apr. 15, 1952 |
| 2,651,112 | Duclos | Sept. 8, 1953 |

FOREIGN PATENTS

| | | |
|---|---|---|
| 565,164 | Great Britain | Oct. 30, 1944 |
| 829,951 | Germany | Jan. 31, 1952 |
| 50,011 | Sweden | Sept. 7, 1921 |